United States Patent
Rao et al.

(10) Patent No.: US 6,393,527 B1
(45) Date of Patent: May 21, 2002

(54) PREFETCH BUFFER WITH CONTINUE DETECT

(75) Inventors: Lakshmi Rao, Sunnyvale; James T. Battle, San Jose, both of CA (US)

(73) Assignee: ATI International SRL (BB)

( * ) Notice: Subject to any disclaimer, the term of this patent is extended or adjusted under 35 U.S.C. 154(b) by 0 days.

(21) Appl. No.: 09/215,413

(22) Filed: Dec. 18, 1998

(51) Int. Cl.$^7$ .............................................. G06F 12/04
(52) U.S. Cl. ........................ 711/137; 711/159; 711/213
(58) Field of Search ................................ 711/137, 204, 711/213, 3, 113, 159, 5; 707/4, 5; 382/305; 712/233, 234, 236, 237, 239, 207, 238, 209; 710/6

(56) References Cited

U.S. PATENT DOCUMENTS

| | | | | |
|---|---|---|---|---|
| 4,926,323 A | * | 5/1990 | Baror et al. ................ | 712/238 |
| 5,093,777 A | * | 3/1992 | Ryan ............................. | 711/3 |
| 5,305,389 A | * | 4/1994 | Palmer ....................... | 382/305 |
| 5,410,653 A | * | 4/1995 | Macon, Jr. et al. ......... | 711/137 |
| 5,426,764 A | * | 6/1995 | Ryan ........................... | 711/204 |
| 5,600,817 A | * | 2/1997 | Macon, Jr. et al. ......... | 711/137 |
| 5,666,505 A | * | 9/1997 | Bailey ........................ | 712/207 |
| 5,689,694 A | * | 11/1997 | Funyu ........................ | 712/234 |
| 5,701,435 A | * | 12/1997 | Chi ............................. | 711/159 |
| 5,761,706 A | | 6/1998 | Kessler et al. ............. | 711/118 |
| 5,774,685 A | | 6/1998 | Dubey ........................ | 395/381 |
| 5,790,823 A | | 8/1998 | Puzak et al. ................ | 395/383 |
| 5,799,162 A | * | 8/1998 | Christie et al. ............ | 712/205 |
| 5,809,529 A | | 9/1998 | Mayfield .................... | 711/137 |
| 5,890,211 A | * | 3/1999 | Sokolov et al. ............. | 711/113 |
| 6,035,383 A | * | 3/2000 | Seal ............................ | 711/213 |
| 6,216,178 B1 | * | 4/2001 | Stracovsky et al. ......... | 710/6 |
| 6,286,075 B1 | * | 9/2001 | Stracovsky et al. ......... | 711/5 |

* cited by examiner

*Primary Examiner*—Matthew Kim
*Assistant Examiner*—B. R. Peugh
(74) *Attorney, Agent, or Firm*—Vedder, Price, Kaufman & Kammholz

(57) ABSTRACT

A prefetch buffer architecture includes a prefetch buffer connected to a memory unit via a global bus. A continue detect unit is also connected to the global bus via a global bus interface. The continue detect unit examines prefetched data words for a predetermined bit pattern indicating the possible presence of a "continue" command. The continue detect unit may use one or more comparator circuits to compare each prefetched data word with the predetermined bit pattern. Multiple comparator circuits can be used in parallel to simultaneously examine multiple data words. When the continue detect unit determines that a data word contains the predetermined bit pattern, indicating the likely presence of a "continue" command, the prefetch operation is suspended. The data word likely to contain the "continue" command is stored in the prefetch buffer until it is called by a decode unit, which decodes the continue command. Once the continue command is decoded, the prefetching operations may resume by prefetching data at the appropriate data address, i.e., the "continue" address. The continue detect unit may also provide the "continue" address to a prefetch control unit so that the prefetching operation may be resumed at the proper "continue" address without waiting for the address to be decoded by the decoding unit.

21 Claims, 4 Drawing Sheets

PREFETCH BUFFER WITH CONTINUE DETECT

FIELD OF THE INVENTION

The present invention relates to prefetch buffer memory and in particular to controlling the prefetching of data to eliminate unnecessarily prefetching and later flushing data.

BACKGROUND

A prefetch buffer is a small, high speed memory device, that is used to store data so that the data is immediately available to downstream processing units. Without a prefetch buffer, the processing unit must access data directly from slower bulk memory. Because today's microprocessors are much faster than the access time of the associated bulk memory, by directly accessing data from bulk memory, the processing unit may be starved, i.e., the processing unit remains idle while the data is obtained.

A prefetch buffer is a small but fast memory device placed between the bulk memory and the processing unit. Data is prefetched and held in the prefetch buffer until needed by the processing unit. Because the prefetch buffer is fast, the processing unit can quickly access data without having to wait for the data to be directly accessed from the slower bulk memory. Thus, prefetch buffers reduce the latency time of the memory system.

FIG. 1 is a schematic diagram showing a conventional prefetch buffer architecture 10, including a prefetch buffer 12, a decode unit 14, a prefetch control unit 16, and a global bus interface 18, which is connected to the global bus 20. Also attached to the global bus 20 is a memory gateway 22 and a bulk memory 24, which may be an off-chip secondary cache of static random-access memory (SRAM) or an even larger main memory of dynamic random-access memory (DRAM).

The prefetch control unit 16 controls when data is prefetched from memory 24. Prefetch control unit 16 signals global bus interface 18 to prefetch data at a particular address in memory 24. The data is retrieved from memory 24 and is stored in prefetch buffer 12 via memory gateway 22, global bus 20 and global bus interface 18. Prefetch buffer 12 stores 8 lines of data, each line contains eight consecutively addressed 32 bit words.

Decode unit 14 retrieves a line of data from prefetch buffer, decodes the line of data and transmits the decoded signal to downstream processing units (not shown). The line of data retrieved by decode unit 14 is the line of data that has been stored in prefetch buffer 12 the longest.

FIG. 2A illustrates a conventional data word 30 of 32 bits, which include a 16 bit command section 32 and a 16 bit parameter section 34. The command section 32, for example, supplies information regarding what is to be done with the data in the parameter section 34. Sometimes the parameter section 34 may be unused, for example, where a "halt" command is present in command section 32.

Additional data words containing only parameters, i.e., no command section, may be associated with a data word containing a command section. As shown in FIG. 2B, two data words 40 and 46 are associated with each other. Similar to data word 30, shown in FIG. 2A, data word 40 contains a command section 42 and a parameter section 44, which may be unused, i.e., some commands necessarily have parameters stored in section 44, while other commands do not use section 44. Data word 46 contains additional parameter data associated with the command found in command section 42. It should be understood that multiple data words containing parameter data may be associated with data word 40. Thus, several additional words containing parameter data may be associated with data word 40.

As discussed above, prefetch buffer 12 stores eight lines of data, with each line containing eight data words of 32 bits each. By way of example, a data word containing a command section, such as word 40 may be stored in a single data line along with seven associated data words with parameters for the command, such as word 46. Alternatively, a line of data may contain multiple words with command sections, along with their associated parameter containing words. Each word stored in prefetch buffer 12 is contiguously addressed with the previous word.

Generally, prefetch control unit 16 independently prefetches data. However, occasionally decode unit 14 prompts prefetch control unit 16 to retrieve data from a different address in memory, when it is necessary to retrieve a data word or series of words that are not contiguously addressed with the preceding data words.

Decode unit 14 determines that it is necessary to prefetch from a new address in memory because the command section of a data word is encoded with a "continue" command and a word having the address of the data to be obtained is encoded in an associated word. FIG. 2C illustrates a data word 50 having a "continue" command in the command section 52 and an associated word 56 having the address of the next data word to be retrieved. As shown in FIG. 2C, when a word contains a "continue" command, the parameter section 54 of the word is unused.

A "continue" command, when received and decoded by decoding unit 14, indicates that subsequent data words (not the associated address containing word) that may be stored in prefetch buffer 12 should not be used, but that data from another address in memory 24 is to be prefetched. When decode unit 14 receives a "continue" command, decode unit 14 communicates to prefetch control 16 that a "continue" command was received and provides prefetch control unit 16 with the new address.

Prefetch control unit 16 stops the prefetching operation, invalidates or "flushes" the contents of prefetch buffer 12 and begins prefetching from the new address. Once the data in prefetch buffer 12 is flushed, the prefetched data from the new address is stored in the now empty lines in prefetch buffer 12. Thus, prefetch buffer 12 will store consecutively addressed words starting at the new "continue" address. Because decode unit 14 receives the data line that has been in prefetch buffer 12 the longest, by the time decode unit 14 receives and decodes a "continue" command up to seven lines of data in prefetch buffer 12 may be full. Thus, seven lines of prefetched data in prefetch buffer 12 may be discarded when a "continue" command is decoded by decode unit 14.

Consequently, a large amount of data may be unnecessarily prefetched from memory 24 via global bus 20 and stored in prefetch buffer 12 only to be discarded later when a "continue" command is decoded. The prefetching of unnecessary data that is later discarded is a waste of valuable bandwidth of the global bus 20 and of memory 24.

Moreover, after the data in prefetch buffer 12 is flushed, the data from the new "continue" address must be fetched, stored in prefetch buffer 12, and then decoded by decoding unit 14 before it is supplied to downstream processing units. This entails time during which the downstream processing units are not receiving data. Thus, the downstream processing units may be starved and required to remain idle while the appropriate data is fetched from memory 24.

SUMMARY

A prefetch buffer architecture includes a prefetch buffer that stores contiguously addressed data words prefetched from a memory and associated control. A continue detect unit is disposed between the memory and the prefetch buffer and is used to examine each data word or a line of data words as it is being written into the prefetch buffer to determine if a "continue" command is likely to be present. If the potential presence of a "continue" command is detected, the prefetching of contiguously addressed data is suspended. The data word or the line of words is stored in the prefetch buffer until called by a decode unit. The decode unit decodes the data word having the "continue" command, and the associated "continue" address, and issues a command to the prefetch control unit to resume prefetching at the "continue" address. Thus, little or no data that is stored in the prefetch buffer needs to be flushed at a later time. Thus, little or no unnecessary data was prefetched, which advantageously saves bandwidth of the global bus.

In one embodiment, the continue detect unit includes a comparator circuit or a parallel series of comparator circuits that examine each data word for a predetermined bit pattern, with which every data word containing a "continue" command is encoded. Each comparator circuit is connected to an OR logic gate, which produces a continue detect signal to the prefetch control unit indicating when one of the data words is likely to contain the "continue" command. Because it is possible for the "continue" command to be present in the last word in a line of data, while the associated "continue" address is present in the first word in the next line of data (which has not been prefetched) a delay circuit is coupled to the comparator circuit that receives the last word in the line of data. Thus, the next line of data containing the "continue" address will be prefetched prior to suspension of the prefetching operation. The use of comparator circuits is a fast and inexpensive method of probabilistic continue detection. While an actual decoder may be used in place of comparator circuits, which will be accurate, i.e., not a probabilistic continue detection, the commands have a variable number of parameters requiring a complex and expensive decoder.

In another embodiment, once continue detect unit detects the predetermined bit pattern, the continue detect unit transmits the "continue" address to the prefetch control unit so that data at the new "continue" address may be prefetched. Thus, the prefetching operation switches from one set of contiguously addressed data words to another set of contiguously addressed data words without waiting for data words with the potential "continue" command and address to be decoded by the decoding unit. Consequently, the prefetch buffer is efficiently utilized thereby avoiding starvation of the pipeline as well as avoiding wasting the bandwidth of the global bus.

BRIEF DESCRIPTION OF THE DRAWINGS

The above and other features, aspects, and advantages of the present invention will become better understood with regard to the following description, appended claims, and accompanying figures, where:

DETAILED DESCRIPTION

In the following detailed description, reference is made to numerous specific details such as specific word and byte lengths and to the accompanying drawings, which include specific embodiments to illustrate the present invention. It is understood, however, that such specifics are not necessary to practice the present invention, and that other embodiments may be utilized and structural changes may be made without departing from the scope of the present invention. Moreover, it should be understood that some well-known elements are shown in this detailed description in block diagram form so as to not obscure the present invention in unnecessary details. For the most part, details concerning timing considerations and the like have been omitted inasmuch as such details are not necessary to obtain a complete understanding of the present invention and are within the knowledge and understanding of persons of ordinary skill in the relevant art.

Figure 3:
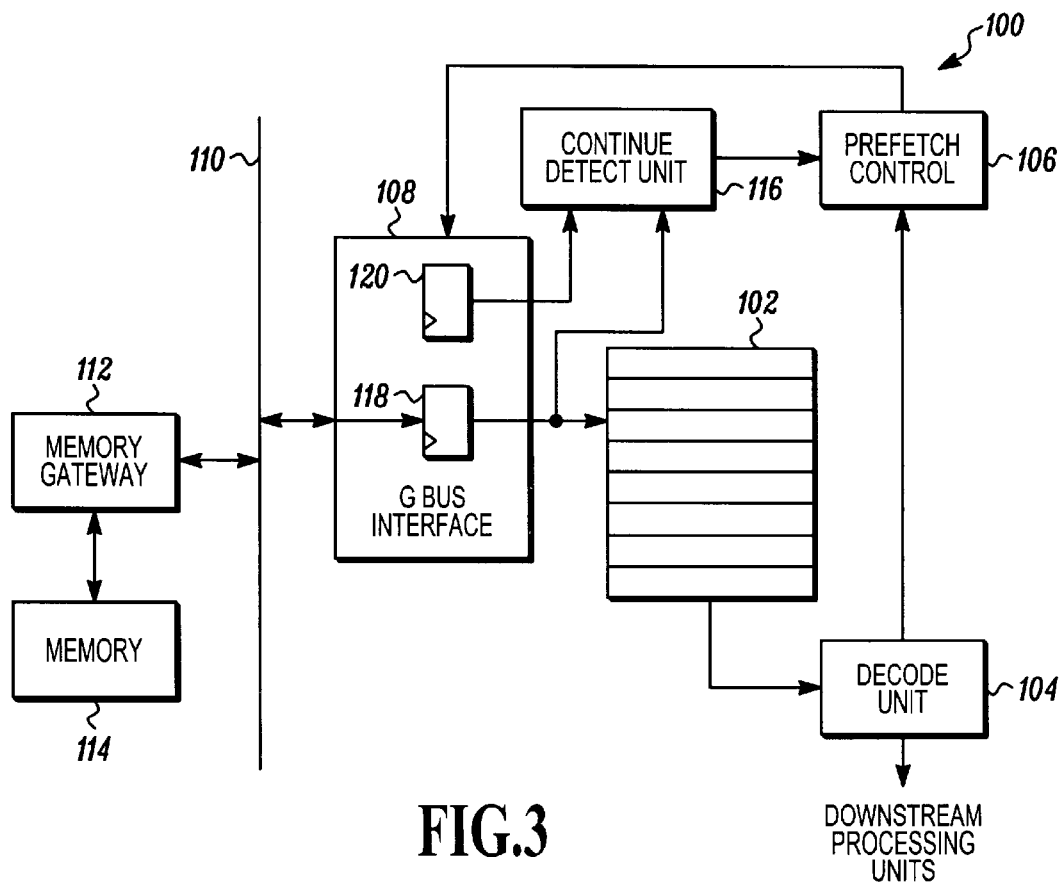
FIG. 3 is a schematic diagram illustrating a prefetch buffer architecture in accordance with an embodiment of the present invention.

FIG. 3 is a schematic diagram illustrating a prefetch buffer architecture 100 in accordance with an embodiment of the present invention. Prefetch buffer architecture 100 includes a prefetch buffer 102, e.g., having eight lines each holding eight 32 bit data words, which is coupled to a conventional decode unit 104. Decode unit 104 is coupled to downstream processing units (not shown) as well as to a conventional prefetch control unit 106. Prefetch control unit 106 is coupled to a global bus interface 108.

Global bus interface 108 is coupled to global bus 110. A memory gateway 112 is also coupled to global bus 110, along with various other devices (not shown). Memory gateway 112 is itself connected to a memory unit 114, which may be an off-chip secondary cache of static random-access memory (SRAM) or an even larger main memory of dynamic random-access memory (DRAM).

Global bus interface 108 is also coupled to prefetch buffer 102 and a continue detect unit 116, which is coupled to prefetch control unit 106. Continue detect unit 116 examines each data word that is being transmitted from global bus interface 108 and written into prefetch buffer 102 and determines whether a "continue" command is present or likely to be present in any data word. If a "continue" command is detected, i.e., deemed likely to be present, continue detect unit 116 provides a continue detect signal to prefetch control unit 106, which then suspends prefetching operations. Thus, continue detect unit 116 performs a probabilistic continue detection.

The prefetch buffer architecture 100 operates according to the following.

Prefetch control unit 106 initiates prefetching operations by signaling global bus interface 108 to fetch data from memory unit 114 at a particular memory address. The command to fetch data is conventionally processed by global bus interface 108 and transmitted to memory gateway 112 via global bus 110.

Figure 1:
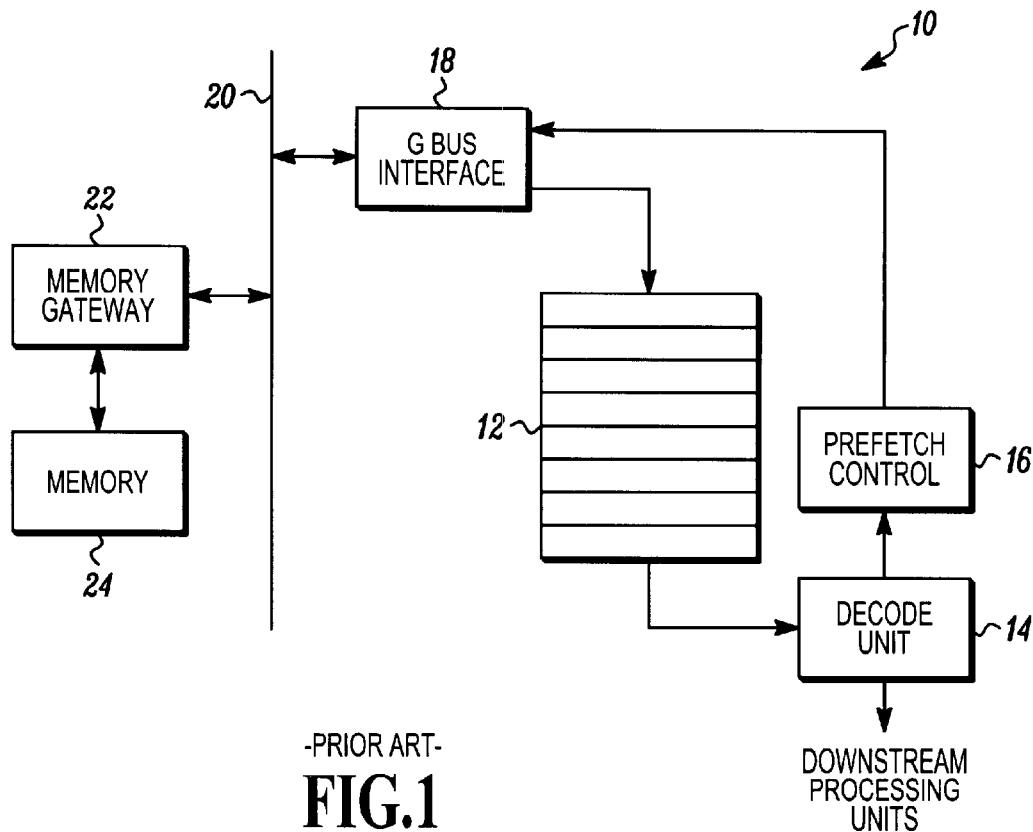
FIG. 1 is a schematic diagram showing a conventional prefetch buffer architecture.
Figure 2A:
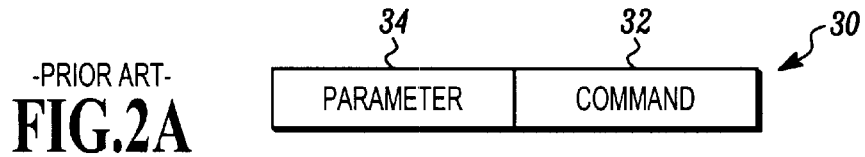
FIGS. 2A and 2B illustrate conventional data words that are stored in memory and prefetched by a prefetch buffer.
Figure 2B:
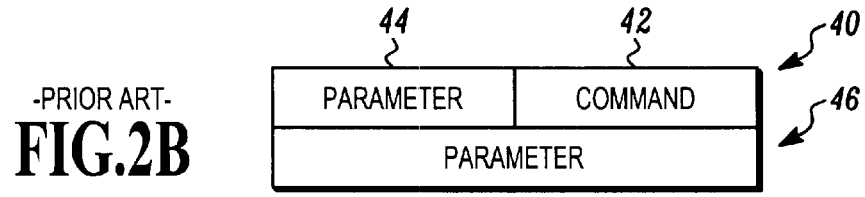

Memory gateway 112 conventionally acquires the desired data from memory 114 and transmits the data back to global bus interface 108 via global bus 110. Global bus 110 has a data width that is the same number of bits that is stored in one line of prefetch buffer 102, e.g., eight words of 32 bits each or 256 bits. The data retrieved from memory 114 may, for example, be in the form of the data words shown in FIGS. 2A and 2B. The global bus interface 108 conventionally determines if the data on the global bus 110 is for prefetch buffer 102. When it is determined that the data on the global bus 110 is for prefetch buffer 102, register 120 is written with a "1" and register 118 is written with the data on the global bus 110.

Thus, the data words from memory unit 114 are received by global bus interface 108 and stored in a register 118. Register 118 stores the same number of bits that is stored in one line of prefetch buffer 102, e.g., eight words of 32 bits each or 256 bits.

The data words stored in register 118 of global bus interface 108 are transmitted to and held in an available line of prefetch buffer 102, when register 120 contains a "1". After the data from register 118 is transmitted to prefetch buffer 102, register 120 contains a "0". If there are no available lines in prefetch buffer 102, prefetch control unit 106 will not prefetch additional data. Once a line or lines become available in prefetch buffer 102, prefetch control unit 106 will signal global bus interface 108 to prefetch additional data.

As the data words stored in register 118 are transmitted to prefetch buffer 102, the data words are also transmitted to continue detect unit 116. Continue detect unit 116 examines each data word to determine if a "continue" command is or is likely to be present, as will be discussed in more detail in reference to FIG. 5.

Of course, if continue detect unit 116 does not detect a "continue" command within the data line stored in register 118, prefetch control unit 106 will continue its prefetching operation.

However, when a "continue" command is detected, continue detect unit 116 transmits a continue detect signal to prefetch control unit 106 indicating that a "continue" command has been detected and prefetch control unit 106 suspends prefetching operations until otherwise commanded by decode unit 104. Nevertheless, the data word that is believed to contain a "continue" command is already stored in prefetch buffer 102. Thus, the data word containing the "continue" command, i.e., the "continue word" is held in a line (along with seven other data words) in prefetch buffer 102 until that line is called by decode unit 104. Because prefetching operations have been suspended, no more lines of data will be retrieved and stored in prefetch buffer 102.

Figure 4:
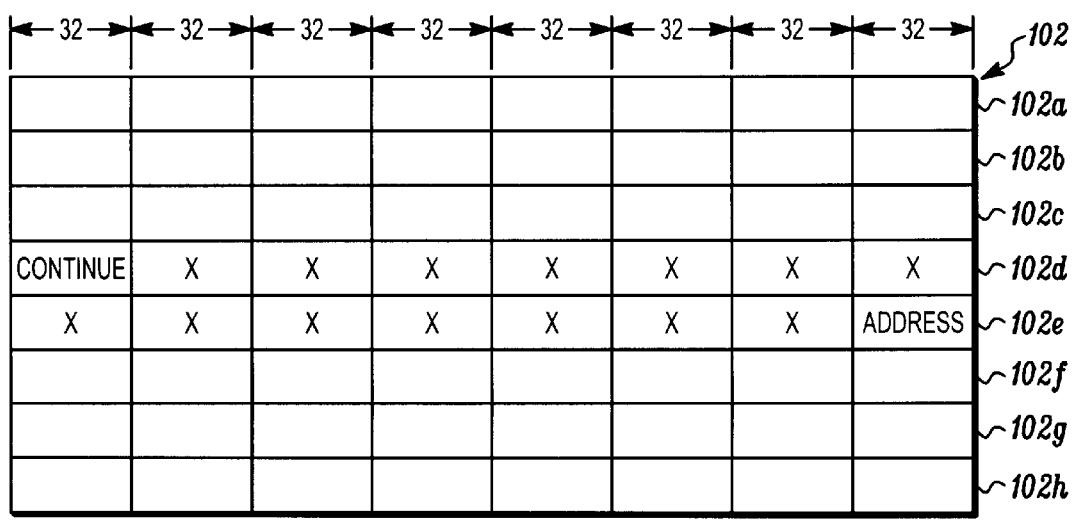
FIG. 4 is a diagram illustrating a prefetch buffer holding two lines of data with a "continue" command and the "continue" address split between two lines.

As shown in FIG. 4, it is possible that the continue word and the associated word containing the "continue" address, i.e., "address word," are divided between two different lines of data. In this case, it is necessary that after the continue word is detected by continue detect unit 116 that one additional line of data is retrieved and stored in prefetch buffer 102. FIG. 4 illustrates eight lines 102a through 102h of prefetch buffer 102, where each line is subdivided into eight 32 bit words. As shown in FIG. 4, lines 102d and 102e contain data, while the remaining lines 102a, 102b, 102c, 102f, 102g, and 102h are empty. As can be seen, the continue word is held in the last word in line 102d, while the associated address word is held in the first word in line 102e (the other words in lines 102d and 102e are occupied by unrelated data as indicated by the letter X). Thus, if the line of data stored in line 102e was not retrieved and stored in prefetch unit 102 after detecting the continue word in the line of data stored in line 102d, the desired "continue" address could not be determined.

Thus, when continue detect unit 116 detects the continue word in the last word of a line of data, a subsequent line of data must be prefetched, stored in register 118 and placed into the next available line in prefetch buffer 102.

As needed, decode unit 104 retrieves the line of data from prefetch buffer 102 that has been held in prefetch buffer 102 the longest. Decode unit 104 decodes the line of data and transmits the decoded signal to downstream processing units (not shown). Eventually, decode unit 104 will retrieve the line of data containing the continue word. Because prefetching operations have already been suspended by continue detect unit 116, when decode unit 104 receives the line of data with the continue word prefetch buffer 102 will have at most one line of data (in the case where the continue word is located in the last word in a data line, as illustrated in FIG. 4).

Decode unit 104 will then access and decode the "continue" command and access the associated "continue" address, which is in the next 32 bit word after the continue word. Decode unit 104 then signals prefetch control unit 106 to resume prefetching data from the new "continue" address. Prefetch control unit 106 then signals global bus interface 108 to fetch data from memory unit 114 at the new "continue" address.

If the "continue" address is in a different line of data then the continue word, decode unit 104 obtains that line of data after decoding the "continue" command. Decode unit 104 then forwards the "continue" address to prefetch control unit 102.

Thus, when prefetch control unit 104 resumes prefetching operations, prefetch buffer 102 will be empty. Consequently, there is no need to flush data from prefetch buffer 102. Hence, no data was unnecessarily prefetched via global bus 110 and held in prefetch buffer 102, thereby saving valuable bandwidth of the global bus 110.

In comparison, a conventional system (without a continue detect unit 116) will continuously prefetch data from memory despite the presence of a "continue" command in one of the data lines stored in the prefetch buffer. When the decode unit decodes the "continue" command (and the desired "continue" address), all the data stored in the prefetch buffer must be flushed. Thus, a conventional system prefetches and then flushes up to seven lines of data in the prefetch buffer whenever a "continue" command is decoded. The flushed data is unused and therefore was unnecessarily prefetched from the memory via the global bus, thereby wasting bandwidth of the global,bus.

Figure 5:
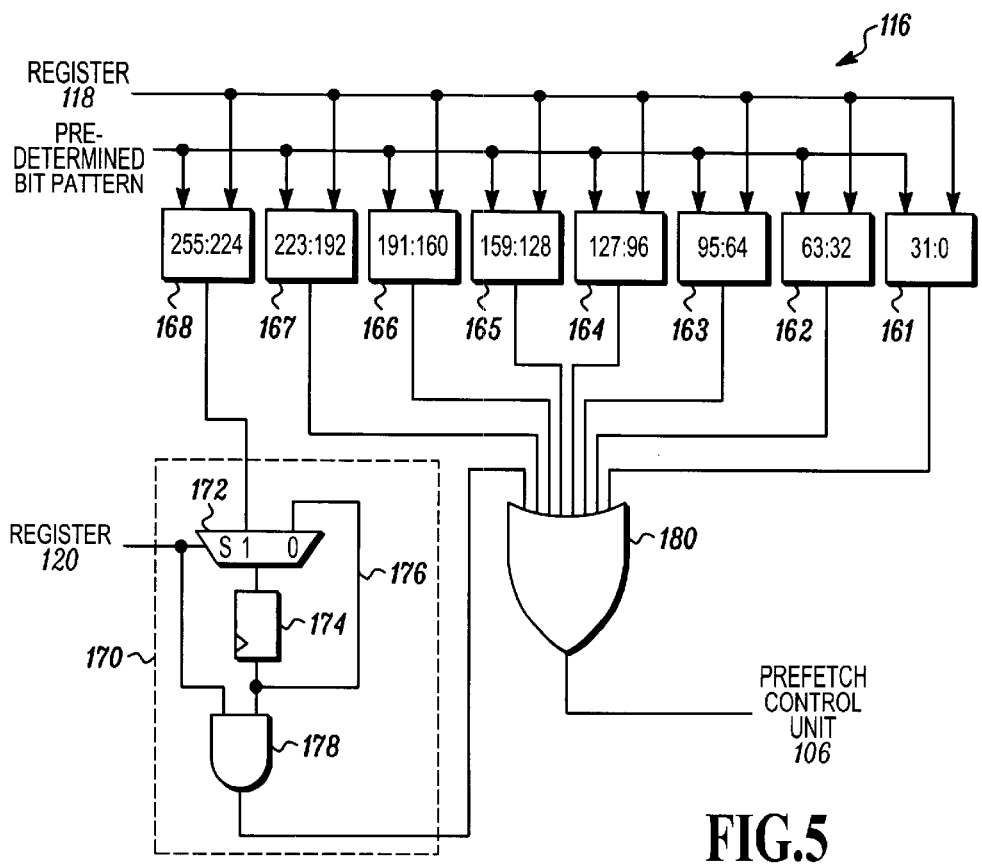
FIG. 5 is a schematic diagram of an embodiment of the continue detect unit.

FIG. 5 is a schematic diagram of one embodiment of continue detect unit 116. Continue detect unit 116 includes a number of comparator circuits 161 through 168, each of which receives a different data word from the data line stored in register 118, shown in FIG. 3. Thus, comparator circuit 161 receives bits 0 through 31, comparator circuit 162 receives bits 32 through 63 and so on as illustrated in FIG. 4, with comparator circuit 168 receiving the last 32 bit word, i.e., bits 224 to 255. Comparator circuits 161–168 also receive a predetermined bit pattern to compare with the data words. Of course, if a different number of data words were stored in each line of prefetch buffer 102, a corresponding number of comparator circuits would be used in continue detect unit 116.

Figure 2C:
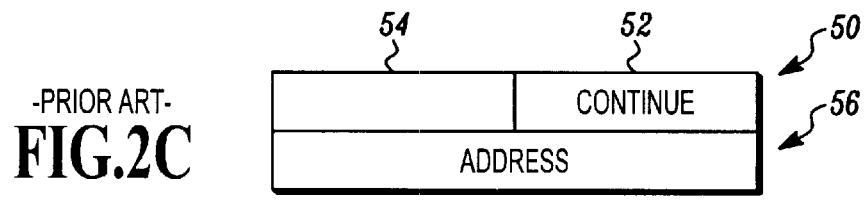
FIG. 2C illustrates data words containing a "continue" command and a "continue" address.
Figure 6:
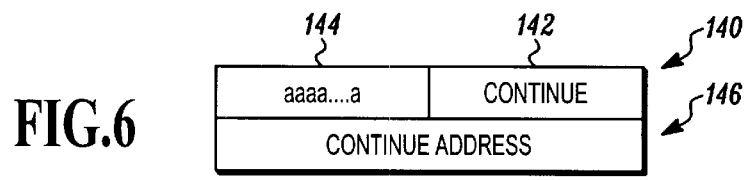
FIG. 6 illustrates data words containing a predetermined bit pattern indicating the presence of a "continue" command and a "continue" address.

FIG. 6 illustrates a data word with a "continue" command, i.e., continue word 140, and an associated data word 146 with the "continue" address, in accordance with one embodiment of the present invention. Continue word 140 has a "continue" command in the command section 142, which for example, may be binary code for the number four. Continue word 140 and data word 146 are similar to data words 50 and 56 shown in FIG. 2C. However, the section 144, which is an otherwise unused field of continue word 140, is encoded with a preselected bit pattern, e.g., aaaa . . . a. The combination of the bit pattern encoded in section 144 and the "continue" bit pattern in command section 142 forms a predetermined bit pattern that can be used by continue detect unit 116 to predict the presence of a "continue" command.

Because the continue block 140 includes a predetermined bit pattern, continue detect unit 116 does not have to decode every data word. Each comparator circuit 161–168 compares its data word with the predetermined bit pattern and produces an output signal indicating whether the predetermined bit pattern is present or not. Thus, continue detect unit 116 can advantageously compare in parallel all the data words in a line of data to determine whether the predetermined bit pattern is present. If the predetermined bit pattern is present in a data word, there is a likelihood that that data word contains the "continue" command. However, there is also a possibility that a parameter of an unrelated data word may coincidentally contain the predetermined bit pattern. Thus, the detection of the predetermined bit pattern is actually a prediction by the continue detect unit 116 that a "continue" command is present. Ideally, the predetermined bit pattern is a pattern that is different from other possible command and parameter patterns, which will enable continue detect unit 116 to predict the presence of a "continue" command with 100 percent accuracy. If desired, continue detect unit 116 can examine only the command section 142 of each data word, thereby obviating the need to specially encode the unused section 144 of a continue word 140 (shown in FIG. 6). However, this may possibly cause a greater number of false detections of the "continue" command.

The output terminals from seven of the comparator circuits 161–167 are connected to OR logic gate 180. The output terminal of comparator circuit 168 is connected to a delay circuit 170 along with register 120, shown in FIG. 3. The output terminal of delay circuit 170 is then connected to OR logic gate 180. Delay circuit 170 is used to delay the output signal of comparator circuit 168 from being received by OR logic gate 180 until the next line of data is being examined by continue detect unit 116.

When one of comparator circuits 161–167 detects the presence of the predetermined bit pattern, the appropriate signal, e.g., a continue detect signal, is transmitted to OR logic gate 180. The OR logic gate 180 accordingly produces a continue detect signal, which is received by prefetch control unit 106. Prefetch control unit 106 will consequently suspend prefetching operations until otherwise directed by decode unit 104.

As discussed, the line of data that is being examined by continue detect unit 116 is already being written into an available line in prefetch buffer 102. When the predetermined bit pattern is detected by one of comparators 161–167, prefetch control unit 106 will suspend prefetching operations and no additional lines of data will be prefetched and stored in prefetch buffer 102. However, the line of data believed to contain the "continue" command is already stored in prefetch buffer 102.

When the predetermined bit pattern is present in the last word in the line of data (such as shown in line 102e in FIG. 4), comparator circuit 168 will produce a continue detect signal, which will be received by delay circuit 170. Delay circuit 170 delays the transmission of continue detect signal from comparator circuit 168 to OR logic gate 180, until another line of data has been prefetched, stored in register 118 and is being written into an available line in prefetch buffer 102. Thus, when OR logic gate 180 receives the continue detect signal from delay circuit 170, one additional line of data, which will include the continue address in the first word of the line, is written into prefetch buffer 102. OR logic gate 180 then transmits the continue detect signal to prefetch control unit 106, which then suspends prefetching operations.

While any desired delay circuit 170 may be used, in one embodiment delay circuit 170 includes a multiplexor 172, a one bit register 174, and an AND logic gate 178. Multiplexor 172 receives the output signal from comparator circuit 168 as well as the output signal from register 174 in a feedback loop 176. Register 120, shown in FIG. 3, is also connected to the delay circuit 170 and provides a select signal to the multiplexor 172 as well as to the AND logic gate 178. The select signal, for example, is a "1" when the next line of data is being written into prefetch buffer 102. The output signal from one bit register 174 is also connected to AND logic gate 178. The output terminal of AND logic gate 178 is then connected to the OR logic gate 180.

When the predetermined bit pattern is present in the last word in the data line, comparator circuit 168 will produce a continue detect signal, e.g., a "1", to multiplexor 172. On the output terminal of one bit register 174 is a "0", which is already stored in register 174 assuming the preceding data line did not contain the predetermined bit pattern in the last word. Thus, in this cycle AND gate 178 will produce a "0" to OR logic gate 180 and prefetch operations will not be suspended.

When comparator 168 produces a "1" to multiplexor 172, register 120 will also produce a "1" to the select terminal of multiplexor 172 and, thus, the output signal of comparator 168, i.e., a "1", is written into register 174. In subsequent cycles, until there is data for the prefetch buffer 102 on the global bus 110 and register 118 gets written with the data on the global bus 110, the select terminal (register 120) to the multiplexor 172 will be a "0". This will cause the feedback path 176 of multiplexor 172 to be selected, which causes the "1" to be retained in register 174. Nevertheless, because register 120 now contains a "0" the AND logic gate 178 will continue producing a "0" to OR logic gate 180 and prefetch operations will not be suspended.

When a new data line for prefetch buffer 102 is transmitted over the global bus 110, register 120 will be written with a "1". Thus, both input terminals to AND logic gate 178 will be a "1" and AND logic gate 178 will produce a "1" in that cycle, thereby causing OR logic gate 180 to produce the continue detect signal to the prefetch control unit 106. Prefetch operations are consequently suspended. Thus, the function of delay circuit 170 is to delay the suspension of the prefetching operation so that one additional line of data, which has the "continue" address located in the first word, can be prefetched and held in prefetch buffer 102.

Ideally, the predetermined bit pattern is a pattern that is different from any possible parameter patterns. However, it is possible that a data word contains a parameter that coincidentally matches the predetermined bit pattern. The continue detect unit 116 will nevertheless send a continue detect signal to prefetch control unit 106, which will suspend prefetching operations. Decode unit 104, however, will recognize that a "continue" command has not been received.

In the case where a false continue detection is made, decode unit 104 will determine that prefetch buffer 102 is empty once it has consumed all the available data. Then decode unit 104 will ask prefetch control unit 106 to start prefetching from a contiguous address, i.e., the last suspended address. Thus, decode unit 104 transmits to prefetch control unit 106 two separate signals, a contiguous address signal and a continue address signal. The contiguous address signal remains high every cycle that decode unit 104 is idle waiting for data from prefetch buffer 102. When prefetch control unit 106 is in the suspend mode after receiving a continue detect signal from continue detect unit 116, and prefetch control unit 106 receives a contiguous signal from decode unit 104, prefetch control unit 106 will prefetch data from the last suspended address. On the other hand, if after receiving a continue detect signal from continue detect unit 116, prefetch control unit 106 receives a continue address signal from decode unit 104, prefetch control unit 106 will start prefetching data from the continue address.

It should be understood that continue detect unit 116 is one method of detecting the presence of the "continue" command and that other methods and circuits may be used if desired. Continue detect may use any number of comparator circuits to detect the predetermined bit pattern. For example, one data word may be examined at a time, and thus only one comparator circuit is used in continue detect. Alternatively, a decoder may be used in place of continue detect unit 116. The use of a decoder to determine whether a "continue" command is present prior to the "continue" command being decoded by decoding unit 104 would be accurate, i.e., not a probabilistic continue detection, but complex and expensive because the commands have a variable number of parameters.

Figure 7:
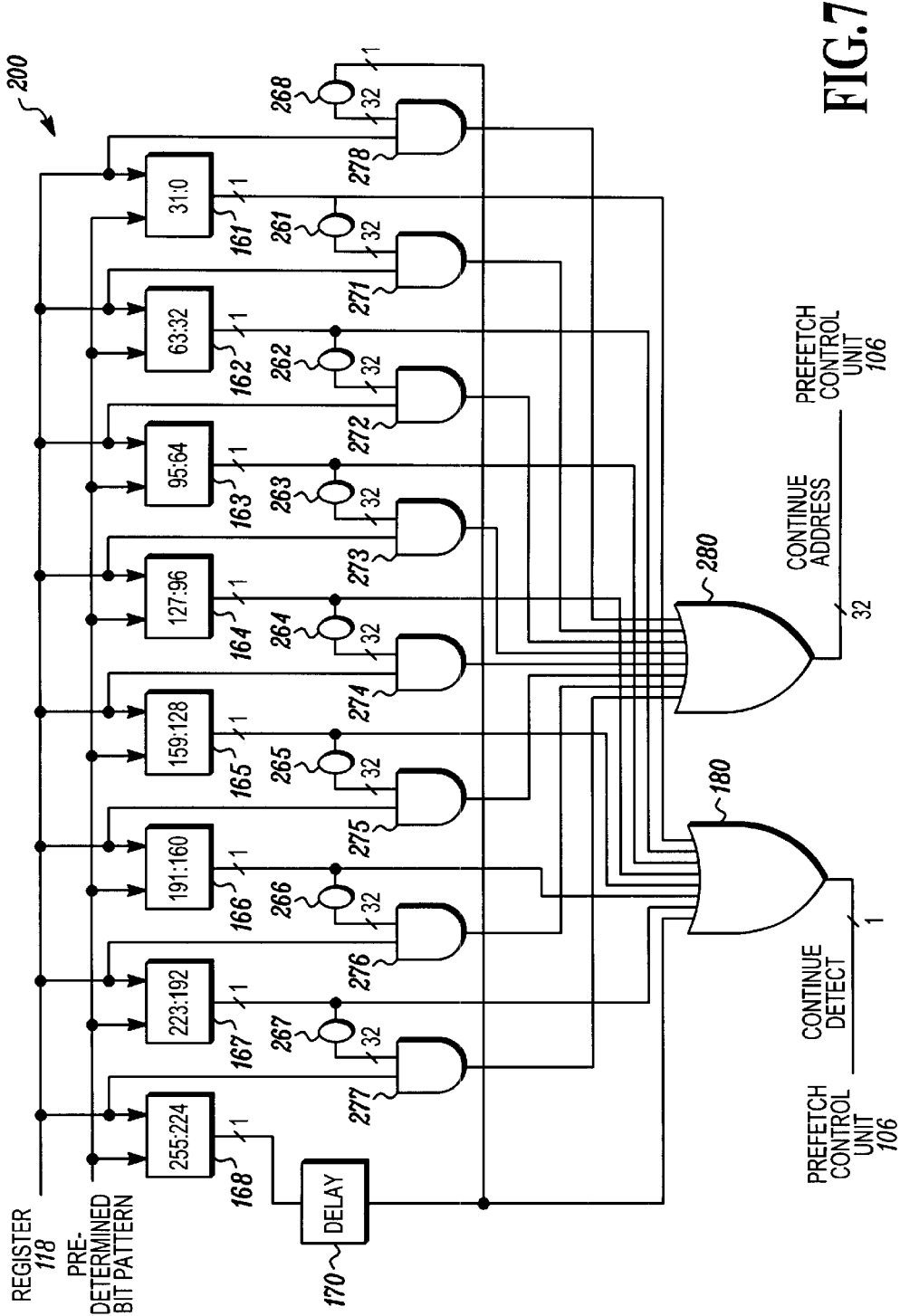
FIG. 7 is a schematic diagram of another embodiment of the continue detect unit.

FIG. 7 is a schematic diagram of a continue detect unit 200 in accordance with another embodiment of the present invention. Continue detect unit 200 is similar to continue detect unit 116, shown in FIG. 5, like designated elements being the same. However, continue detect unit 200 not only transmits a continue detect signal to prefetch control unit 106 when the predetermined bit pattern is detected via OR logic gate 180, but also sends the "continue" address to prefetch control unit 106 via OR logic gate 280. Prefetch control unit 106 then suspends prefetching operations from the old address and resumes prefetching data from the new continue address. Consequently, there is virtually no interruptions in the prefetching of data nor is there a need to flush data from the prefetch buffer 102.

As shown in FIG. 7, continue detect unit 200 includes several comparator circuits 161–168, into which are fed, at one input terminal, the data line stored in register 118 and, at the other input terminal, the predetermined bit pattern. Each comparator circuit 161–168 receives one 32 bit data word, similar to continue detect 116 discussed in reference to FIG. 5.

Each comparator circuit 161–168 compares its data word with the predetermined bit pattern. If a comparator circuit 161–168 detects the predetermined bit pattern, it produces a one bit continue detect signal, i.e., a "1", indicating that the "continue" command is likely to be present in that data word. Of course, if no predetermined bit pattern is detected, the comparator circuits 161–168 will not produce a continue detect signal, i.e., a "0."

The output terminals of comparator circuits 161–167 are placed in an associated 32 bit replicate units, 261–267, respectively, which simply replicate the output signals from the comparator circuits. Thus, if a "0" was produced, 32 bit replicate units 261–267 will produce a signal with 32 "0"s, whereas if a "1" is produced by comparator circuits 161–167, the associated 32 bit replicate units will produce a signal with 32 "1"s.

The output terminals of each 32 bit replicate units 261–267 are coupled to an input terminal of 32 bit AND logic gates 271–277. The other input terminals of the 32 bit AND logic gates 271–277 are coupled to the data word input terminal of a subsequent (counting right to left) comparator circuit 162–168. Thus, for example, 32 bit AND logic gate 274 receives at one input terminal the 32 bit replicated output signal from comparator circuit 164, while at the other input terminal, 32 bit AND logic gate 274 receives the data word received by comparator circuit 165, i.e., bits 128 through 159.

To continue with the example, if the "continue" command is present in bits 96 through 127, comparator circuit 164 will detect the predetermined bit pattern and produce a continue detect signal, which will be replicated by 32 bit replicate unit 264. The 32 bit AND logic gate 274 will AND the replicated continue detect signal with bits 128 through 159, which is the associated address word. Consequently, 32 bit AND logic gate 274 will reproduce the "continue" address. Because the other comparator circuits 161–163 and 165–168 will produce no continue detect signal, i.e., "0"s, the other 32 bit AND logic gates 271–273 and 275–277 will produce "0"s.

The output terminals of each 32 bit AND logic gate 271–277 is coupled to a 32 bit OR logic gate 280. Thus, where one of the 32 bit AND logic gates 271–277 produces the "continue" address, 32 bit OR logic gate 280 will also produce the "continue" address, which is sent to the prefetch control unit 106, shown in FIG. 3, along with the continue detect signal from OR logic gate 180. Prefetch control unit 106 then stops prefetching data and resumes prefetching data at the new "continue" address.

As shown in FIG. 7, the output terminal of comparator circuit 168 is coupled to a delay circuit 170, which operates as described above in reference to FIG. 5. The delay circuit 170 delays producing the output signal from comparator circuit 168 until the subsequent data line is received by continue detect unit 200. The output terminal of delay circuit 170 is received by another 32 bit replicate unit 268, which operates the same as 32 bit replicate units 261–267. The output signal of 32 bit replicate unit 268 is a 32 bit signal that is received by a 32 bit AND logic gate 278 along with the first data word, i.e., bits 0 through 31, in the subsequent data line. The output terminal of 32 bit AND logic gate 278 is also coupled to the 32 bit OR logic gate 280.

Thus, if the "continue" command is located in the last data word in a data line, i.e., bits 224 through 255, comparator circuit 168 will produce a continue detect signal. However, the associated "continue" address will be in the first data word in the next data line. Thus, the continue detect signal is delayed in delay circuit 170 until the next data line is received by continue detect unit 200. The continue detect signal is then replicated by replicate unit 268 and a logic 32 bit AND function is performed with the replicated continue detect signal and the "continue" address in the first data word of the new data line. The "continue" address is produced by 32 bit AND logic gate 278 as well as the 32 bit OR logic gate 280 and received by prefetch control unit 106.

Thus, there is virtually no interruptions of the prefetching of data. Prefetch buffer 102 will remain full of data, which will avoid potentially starving the data stream. Further, global bus 110 is not used to prefetch data that will be later flushed from the prefetch buffer 102. Thus, the bandwidth of global bus 110 is saved.

Because continue detect unit 200 compares each data word with a predetermined pattern, continue detect unit 200 may occasionally produce a false continue detect signal, i.e., the data word contains the predetermined bit pattern but does not contain the "continue" command. In such an instance, the continue address sent to prefetch control unit 106 by continue detect unit 200 will also be false, i.e., a "false continue address". Thus, prefetch control unit 106 will prefetch data from a wrong memory address.

Figure 8:
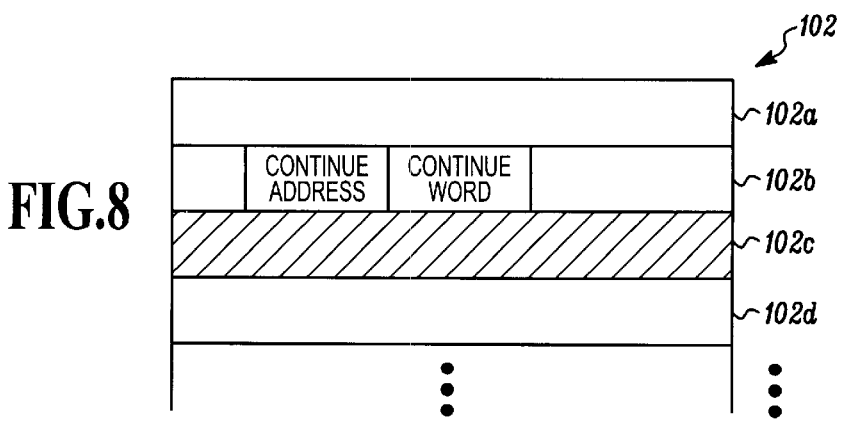
FIG. 8 shows a portion of prefetch buffer 102, including data lines 102*a*, 102*b*, 102*c* and 102*d* with a gap between the data line containing the "continue" command and "continue" address, and the data line containing contiguously addressed data words starting from a new address.

One way to prevent decode unit 104 from receiving and decoding data that was obtained from a false continue address, a gap maybe inserted in between data lines in prefetch buffer 102. FIG. 8 shows a portion of prefetch buffer 102, including data lines 102a, 102b, 102c and 102d. When continue detect unit 200 produces a continue detect signal, a gap will be inserted in the next line of prefetch buffer 102. Thus, as shown in FIG. 8, if a continue detect signal is produced by continue detect unit 200 and the data line is stored, e.g., in line 102b, the next data line 102c will be left blank. Data prefetched from the continue address will then be stored in subsequent data lines, e.g., beginning with line 102d.

If the continue detect signal is true, i.e., there is a "continue" command in the data word, decode unit 104 will receive and decode the data, e.g., stored in line 102b as shown in FIG. 8. After decode unit 104 decodes a "continue" command, decode unit 104 will skip a line of data in prefetch buffer 102, e.g., line 102c, and will then receive and decode data beginning at the next line, e.g., line 102d. On the other hand, if the continue detect signal is false, and thus the continue word and continue address shown in FIG. 8 are false, decode unit 104 will not receive and decode a "continue" command and will not skip a line in prefetch buffer 102. Decode unit 104 will consequently receive an empty line of data, e.g., from line 102c. As discussed above in reference to continue detect unit 116 and FIG. 5, when decode unit 104 is idle because there is no data in prefetch buffer 102, decode unit 104 will provide a contiguous signal to prefetch control unit 106. Prefetch control unit 106 will then flush the data stored in prefetch buffer 102 and to fetch data from the last suspended address.

It should be noted that with a prudent choice of predetermined bit patterns, a false continue detect signal will not occur or will occur only rarely. Thus, the savings in bandwidth of global bus 110 generated by continue detect unit 200 will more than make up for the loss in bandwidth caused by flushing prefetch buffer 102 on the rare occasion of a false continue detect signal.

Another method of preventing data obtained from a false address to be received and decoded by decode unit 104 is to use a full decode unit as continue detect unit 200. Thus, a positive determination of the "continue" command may be made, thereby avoiding false continue detect signals.

It should be understood that while the use of probabilistic continue detection is described in detail in the present disclosure, commands other than "continue" may similarly be detected by encoding an otherwise unused field in the data word with a predetermined bit pattern and then comparing each data word with the predetermined bit pattern. One of ordinary skill in the art may implement similar probabilistic detections for other commands in light of the present disclosure.

Although the present invention has been described in considerable detail with reference to certain versions thereof, other versions are possible. Therefore, the spirit and scope of the appended claims should not be limited to the description of the versions depicted in the figures.

What is claimed is:

1. A method of prefetching data, said method comprising:

prefetching contiguously addressed data words from a memory;

examining each contiguously addressed data word for a command indicating that a subsequent data word to be prefetched is a non-contiguously addressed data word, by comparing the data in each data word with a predetermined bit pattern indicating the presence of said command;

suspending prefetching contiguously addressed data words when a command indicating that a subsequent data word to be prefetched is a non-contiguously addressed data word is detected in one of said contiguously addressed data words; and storing said contiguously addressed data words in a prefetch buffer until said contiguously addressed data words are to be decoded.

2. The method of claim 1, wherein suspending prefetching contiguously addressed data words is delayed until at least one additional data word is prefetched, said additional data word containing the memory address of the non-contiguously addressed data word to be prefetched.

3. The method of claim 1, further comprising:

retrieving said contiguously addressed data words stored in said prefetch buffer by a decode unit;

decoding said contiguously addressed data words, including the data word containing said command indicating that a subsequent data word to be prefetched is a non-contiguously addressed data word and the next data word containing the memory address of the non-contiguously addressed data word to be prefetched; and resuming prefetching contiguously addressed data words.

4. The method of claim 3, wherein resuming prefetching contiguously addressed data words begins with the memory address of the non-contiguously addressed data word.

5. The method of claim 1, further comprising:

prefetching data words beginning with a non-contiguous memory address after suspending prefetching contiguously addressed data words; and wherein suspending prefetching contiguously addressed data words comprises not prefetching the data word from the next contiguous memory address.

6. A computer system comprising:

a global bus;

a memory coupled to said global bus;

a global bus interface, said global bus interface coupled to said global bus;

a prefetch control unit coupled to said global bus interface, said prefetch control unit controls the prefetching of data from said memory;

a prefetch buffer coupled to said global bus interface, said prefetch buffer stores prefetched data;

a decode unit coupled to said prefetch buffer; and a continue detect unit disposed between said global bus interface and said prefetch control unit, said continue detect unit detects the presence of a predetermined bit pattern in said prefetched data indicating the presence of a continue command in said prefetched data and prevents said prefetch control unit from prefetching additional data from contiguous memory addresses.

7. The computer system of claim 6, said global bus interface comprising:

a first register disposed between said continue detect unit and said memory, said first register coupled to said prefetch buffer, said first register receiving and storing said prefetched data while said continue detect unit examines previously prefetched data for said predetermined bit pattern.

8. The computer system of claim 7, said continue detect unit comprises:

at least one comparator circuit coupled to said first register and said prefetch control unit, said at least one comparator circuit receiving a data word from said first register and receiving said predetermined bit pattern, said at least one comparator circuit produces an output signal indicating whether said predetermined bit pattern is present in said data word.

9. The computer system of claim 7, said continue detect unit further comprises:

a plurality of comparator circuits coupled to said first register, each of said comparator circuits receiving a different data word from said first register and receiving said predetermined bit pattern, each of said comparator circuits coupled to an OR logic gate having an output terminal coupled to said prefetch control unit;

a last comparator circuit coupled to said first register and having an output terminal, said last comparator circuit receiving the last data word stored in said first register and receiving said predetermined bit pattern; and a delay circuit coupled to said output terminal of said last comparator circuit, said delay circuit having an output terminal coupled to said OR logic gate.

10. The computer system of claim 9, wherein:

said global bus interface further comprises a second register storing a select enable command indicating when a new data line is prefeteched from said memory;

said delay circuit further comprises:

a multiplexor having a first input terminal, a second input terminal, a select terminal, and an output terminal, said first input terminal coupled to the output terminal of said last comparator circuit, said select terminal coupled to said second register;

a third register having an input terminal and an output terminal, said input terminal coupled to the output terminal of said multiplexor, said output terminal coupled to the second input terminal of said multiplexor; and an AND logic gate having a first input terminal, a second input terminal and an output terminal, said first input terminal coupled to the output terminal of said third register, said second input terminal coupled to said second register, said output terminal coupled to said OR logic gate.

11. The computer system of claim 9, wherein said continue detect unit further comprises:

a plurality of replicate units coupled to the respective output terminals of said plurality of comparator circuits, said replicate units replicate the output signal of said comparator circuits to produce a replicated output signal having the number of bits found in the data words received by said comparator circuits;

a plurality of multiple bit AND logic gates having first input terminals, second input terminals, and output terminals, the first input terminals of said multiple bit AND logic gates being coupled to the output terminals of said comparator circuits via said replicate units, the second input terminals coupled to the input terminal of a subsequent comparator circuit receiving a subsequent data word, the output terminal coupled to the OR logic gate;

a last replicate unit coupled to the output terminal of said delay circuit, said replicate unit replicates the output signal of the delay circuit to produce a replicated delay circuit output signal having the number of bits found in the data words received by said comparator circuits; and a last multiple bit AND logic gate having a first input terminal, a second input terminal, and an output terminal, said first input terminal coupled to the output terminal of the delay circuit via said last replicate unit, said second input terminal coupled to the input terminal of a first comparator circuit receiving the first data word, and the output terminal coupled to said OR logic gate.

12. A prefetch buffer architecture, comprising:

a prefetch buffer coupled to a memory unit via a global bus;

a prefetch control unit controls the prefetching of data from said memory that is held in said prefetch buffer; and means for suppressing said prefetching of data based on the presence of a command in a data word in said data indicating that subsequent data words to be prefetched are located at a non-contiguous address in said memory, said means for suppressing said prefetch operation disposed between said prefetch buffer and said memory, said means for suppressing comprising a means for comparing each data word in a line of prefetched data with a predetermined bit pattern, said predetermined bit pattern indicating that a data word contains said command indicating that subsequent data words to be prefetched are located at a non-contiguous address in said memory.

13. The prefetch buffer architecture of claim 12, wherein:

said means for suppressing said prefetch operation is a continue detect unit coupled to said prefetch control unit, said continue detect unit providing a continue detect signal to said prefetch control unit indicating that subsequent data words to be prefetched are located at a non-contiguous address in said memory, said continue detect unit comprises:

at least one comparator circuit coupled to said memory, each of said at least one comparator circuit receiving a different data word and the same predetermined bit pattern, said at least one comparator circuit providing said continue detect signal when the presence of said predetermined bit pattern is detected.

14. The prefetch buffer architecture of claim 12, further comprising: means for resuming said prefetching data words starting at a new non-contiguous address in said memory.

15. The prefetch buffer architecture of claim 14, said means for resuming said prefetching data words comprising a decode unit receiving the data words stored in said prefetch buffer and decoding the data word containing said command indicating that subsequent data words to be prefetched are located at a non-contiguous address in said memory, the next data word contiguously addressed from said data word containing said command contains the non-contiguous data address, said decode unit providing said non-contiguous address to said prefetch control unit.

16. The prefetch buffer architecture of claim 14, said means for resuming said prefetching data words comprising said means for suppressing said prefetching of data, said means for suppressing said prefetching of data transmitting the data word containing the non-contiguous data memory address to said prefetch control unit, wherein said data word containing the non-contiguous data memory address is contiguously addressed with said data word containing said command indicating that subsequent data words to be prefetched are located at a non-contiguous address in said memory.

17. A computer system comprising:
   a global bus;
   a memory coupled to said global bus, said memory storing data words;
   means for retrieving said data words; and
   a detect unit for receiving said data words and detecting the likely presence of a particular command, including a predetermined bit pattern in an otherwise unused field in a data word, thereby reducing the likelihood of false detects.

18. The computer system of claim 17, said means for retrieving said data words comprises a global bus interface and a prefetch control unit, said global bus interface coupled to said global bus and said prefetch control unit coupled to said global bus interface, said prefetch control unit controls the prefetching of said data words from said memory.

19. The computer system of claim 17, said detect unit comprises:

at least one comparator circuit receiving said data word that contains said particular command and receiving said predetermined bit pattern, said at least one comparator circuit produces a detect output signal indicating that said predetermined bit pattern is present in said data word.

20. The computer system of claim 19, said detect unit further comprises:

a plurality of comparator circuits receiving a plurality of data words one of which is said data word that contains said particular command and receiving said predetermined bit pattern, each of said comparator circuits produces an associated detect output signal indicating whether said predetermined bit pattern is present in an associated data word; and an OR logic gate coupled to said plurality of data words, said OR logic gate producing an output signal indicating if one of said plurality of comparator circuits produces a second detect output signal indicating that said predetermined bit pattern is present.

21. The computer system of claim 20, said detect unit further comprises:

a last comparator circuit receiving the last data word of said plurality of data words and receiving said predetermined bit pattern, said last comparator circuit produces a detect output signal indicating whether said predetermined bit pattern is present in said last data word; and a delay circuit receiving said detect output signal from said last comparator circuit, said delay circuit coupled to said OR logic gate, said delay circuit produces a delayed detect signal to said OR logic gate.

* * * * *